Figure 1:
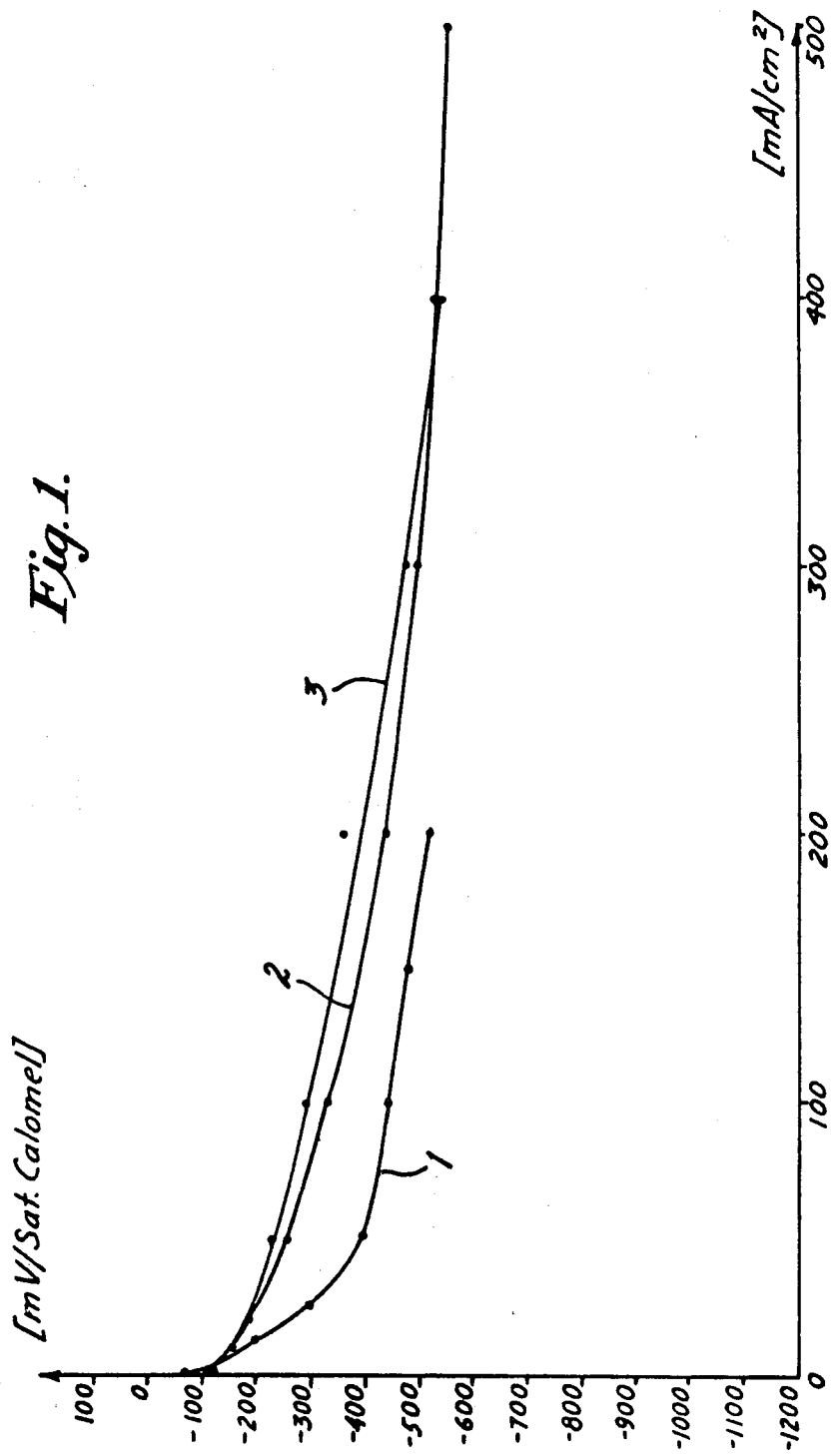

United States Patent

[11] 3,607,787

[72] Inventors  Margarete Jung
              Nieder-Eschbach;
              Harald Becker, Frankfurt am Main; Hans von
              Doehren, Frankfurt am Main, all of
              Germany
[21] Appl. No. 870,260
[22] Filed      Nov. 12, 1969
[23]           Division of Ser. No. 579,408, Sept. 14, 1966,
               Patent No. 3,479,276
[45] Patented  Sept. 21, 1971
[73] Assignee  Varta Aktiengesellschaft
               Frankfurt am Main, Germany

[54] SILVER-CONTAINING MATERIAL AND
     ELECTRODES AND PROCESSES
     3 Claims, 2 Drawing Figs.
[52] U.S. Cl. .................................................. 252/474,
                                              252/476, 252/466

[51] Int. Cl. ...................................................... B01j 11/08,
                                                                 B01j 11/22
[50] Field of Search ............................................ 252/476,
                                                                  466, 474

[56]                    References Cited
                    UNITED STATES PATENTS
     3,380,934   4/1968   Batzold ........................ 252/462
Primary Examiner—Daniel E. Wyman
Assistant Examiner—Philip M. French
Attorneys—Erich M. Radde, Charles A. McClure, Gerard J.
     Weiser and Alfred Stapler ABSTRACT: A method for the preparation of catalytically active particulate material which includes sorbing hydrogen into the particles of hydrogen-sorbing metallic material, treating the particles with an ionic silver solution, reducing the silver to the metallic state and depositing it onto the particles.

SILVER-CONTAINING MATERIAL AND ELECTRODES AND PROCESSES

This is a division of application Ser. No. 579,408 filed Sept. 1966, now U.S. Pat. No. 3,479,276.

The present invention relates to novel catalytically active, silver-containing particulate material to electrodes comprising the novel materials and to processes for the production of said particulate material and of said electrodes.

Silver and silver-containing materials have been used for a long time as a catalyst for the electrochemical production of oxygen and for the utilization of oxygen, oxygen-containing gases and oxygen-delivering chemical compounds in the production of electrical energy.

Silver has been used in these applications in form of massive foils of silver or silver alloys or in form of porous electrodes. The porous electrodes may be produced from powdered silver, especially also in form of the so-called "Molecular-silver" as the starting material. The electrodes may also be made from particulate carrier materials such as carbon powder or zinc oxide, which are at least in part coated with silver. Conveniently the loose carrier material is impregnated with silver-containing solutions or mixed with solid silver compounds and subsequently formed into the desired electrodes with the reduction of the silver compounds to metallic silver. This type of electrodes may also be made in a variant of the process of the prior art by impregnating the preformed porous electrode skeleton with silver-containing solutions and subsequent reduction.

Oxygen electrodes having satisfactory performance may also be obtained by the incorporation of a powder of Raney-silver-alloys in an electrically conducting skeleton-supporting structure with subsequent activation of the alloy.

The above-described oxygen electrodes which consist completely, or to the greatest proportion, of silver are very expensive. This applies to some extent also to the mechanically stable Raney-nickel containing double-skeleton-catalyst electrodes which contain about 40 percent by weight or more silver. Furthermore, disregarding the various other required process steps the activation of the Raney-nickel-alloys in the skeletal structure of the electrode alone is very time consuming and tedious.

The introduction of silver by the said impregnation methods is also time consuming and complex. In order to obtain the silver in the required, fine distribution, the impregnation is carried out repeatedly in several steps whereby it is required that the material be completely dried after each impregnation.

The electrodes in which the metallic silver is deposited on the carrier material by the thermal decomposition of silver-containing compounds are, like the massive silver electrodes, catalytically less active. They can only be used in applications where the silver is expected to be less catalytically active, as is the case e.g. in fuel cells which are operated under pressure and at elevated temperatures such as 200° C., or higher.

It has also been proposed to dissolve two or more catalyst metals together to form a solution of reducible and/or readily decomposable compounds or complexes of these metals with subsequent precipitation and decomposition and, if applicable, reduction of the precipitate. In this work it became, however, apparent that it is required to mix this type of catalyst, prior to the compression and sintering with a separate skeleton-supporting material, if it is desired to obtain self-supporting electrodes.

It is therefore an object of the present invention to provide novel catalytically active particulate silver-containing materials which do not have the disadvantages of the prior art.

It is another object of the invention to provide novel, catalytically active particulate silver-containing materials which can be manufactured at less cost and which can be readily manufactured into electrodes of high activity.

Another object of the invention is the provision of new oxygen electrodes of high catalytic activity which have a combination of advantageous properties and yet are of simple and less expensive construction.

Still another object of the invention is the provision of a new, simple and convenient process for the production of novel catalytically active particulate materials which are particularly useful for the manufacture of improved electrodes.

A further object of the invention is the provision of a novel, simple process for the production of highly active oxygen electrodes.

Other objects will become apparent as the description of the invention proceeds.

These and other objects of the invention are achieved by a novel, catalytically active, particulate material which comprises metallic particles comprising at least one metal which is capable of sorbing hydrogen, and affixed to the surface of said particles at least a partial cover layer of a mixture which comprises metallic silver and the metal which is contained in said core metal-containing particle.

The base or core metallic particles may consist of one or several metals which are capable of sorbing hydrogen, including alloys of these metals, or it may be composed of a porous carrier material which contains imbedded or affixed on its surface at least one of the hydrogen-sorbing metals. The central metallic particles may contain also other additives.

The cover layer of the novel particles may contain other catalytically active metals or additives in addition to silver and the hydrogen-sorbing base metal.

The invention provides also oxygen electrodes having a combination of unique properties which comprise in the layer which catalyses the electrochemical processes the novel catalytically active particulate material of the present invention.

The objects of the invention are furthermore achieved by a process for the preparation of a silver-containing particulate material which comprises the steps of sorbing hydrogen in a hydrogen-sorbing metal and treating the particles thus obtained with a silver-ion-containing solution, reducing the silver to the metallic state and recovering the silver-coated particles.

More specifically, the process of the invention for the preparation of a novel silver-containing precipitate comprises sorbing hydrogen in a hydrogen-sorbing metal, suspended in a liquid, adding a silver-ion-containing solution to the suspended metal, adding a reducing compound, adjusting the $p_H$ to about neutral, and thereby precipitating the silver-containing precipitate.

A superior product of highest catalytic activity is obtained if the surface of the individual hydrogen-sorbing metal particles is freshly etched e.g. treated for a limited time with a solvent for the metal. With those hydrogen-sorbing metals which are at least partially soluble in dilute acids, the sorbtion of hydrogen and the etching of the surface of the particles may be combined in an acid pretreatment of the metal particles prior to the addition of the silver-ion-containing solution.

Figure 2:
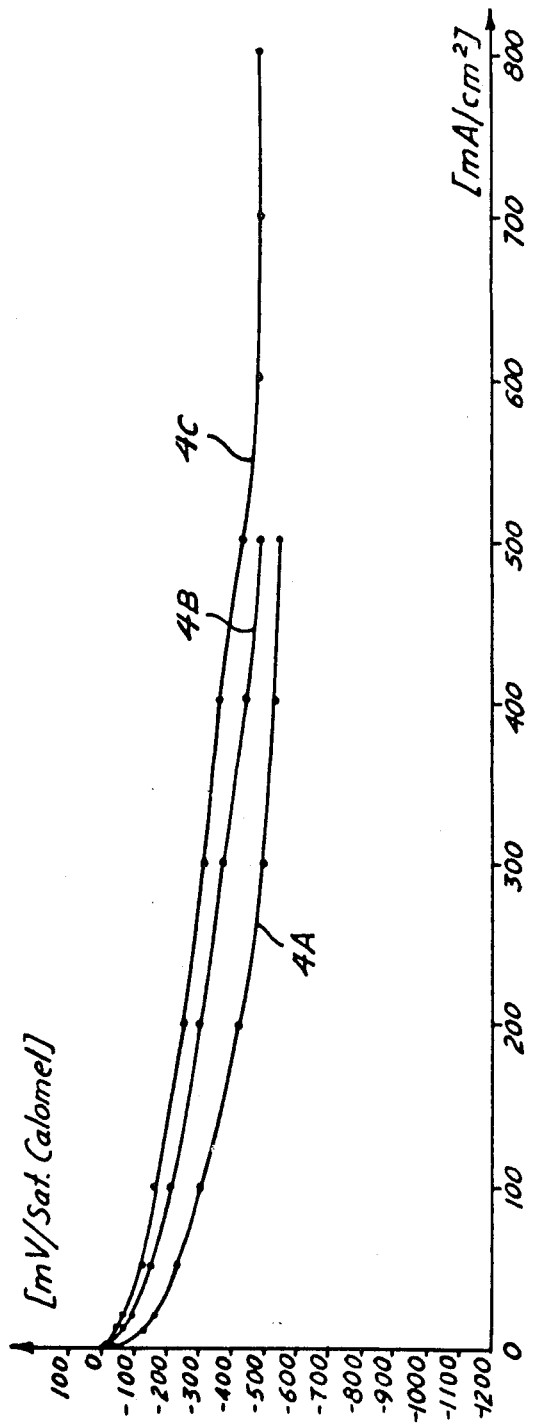

FIGS. 1 and 2 in the attached drawings represent performance curves of various electrodes made in accordance with the process of the invention.

The novel oxygen electrodes of the invention have a high catalytic activity with, at the same time, a simple construction. The whole electrode, or at least that layer of the electrode which catalyses the electrochemical process, contains a metallic powder which is capable of sorbing hydrogen, such as nickel. The individual metal particles of the powder are fully or at least to the greatest part covered by a tightly adhering layer which consists of a mixture containing silver and in addition the same metal or a combination or alloy of the same metal of which the particles of the powder are composed. Preferably the surface of the individual metal particles is slightly dissolved or etched.

If higher demands are made on the electrodes, for instance if the electrodes are to be used as oxygen-reducing electrodes in a fuel cell which is to be operated with impure air, it is of advantage if the said surface layer on the metal particles contains besides the hydrogen-sorbing metal and silver in addition such catalysts which further promote the oxygen activation such as palladium, platinum, osmium and other transition elements of group 8 of the Periodic Table of the elements, cerium and other rare earth elements or manganese and group homologues or copper. In most instances an amount of these additive materials which does not exceed 10 percent by weight, banned on the material in the cover layer, is sufficient.

If the electrodes are to be used in fuel elements, it is desirable that the cover layer of the metal particles contains up to 5 percent by weight of copper or copper compounds in order to minimize damage to the electrodes in case of electrical overloading or in the event of the interruption of the gas supply with the disadvantages resulting therefrom.

The silver-containing porous oxygen electrodes of the invention are characterized by containing at least in one layer of the electrode a metallic powder which is capable of taking up hydrogen; the surface of the powder is totally, or to the greatest part, about at least 75 percent covered by a mixture of silver and the metal or chemical derivative of the metal of the powder.

For use with alkaline electrolytes it is preferred that the said metallic powder consists of or comprises nickel, nickel and iron or the alloys of these metals. If desired, the electrodes may contain in addition to the metallic powder having the capability of taking up hydrogen a porous material in which or upon which the hydrogen-sorbing material e.g. nickel and/or iron and/or alloys of these metals have been deposited.

The preferred electrodes of the invention contain a hydrogen-sorbing metallic powder, the surface of which is totally or to the greater part covered with a layer which comprises silver as the major component. Advantageously, the side of the electrode which faces the electrolyte is provided with an additional cover layer which has smaller pores than the catalytically active layer containing the metallic powder of the invention.

In accordance with the invention, the metallic powder used for the manufacture of the electrodes of the present invention are preferably produced by a process which comprises sorbing hydrogen into the metallic powder, subsequently treating the powder with a silver-ion-containing solution and thereafter with a reducing agent in a quantity sufficient for the reduction of said ions to the metal form, if necessary with the subsequent addition of hydroxyl ions whereafter the precipitate is filtered off, washed, dried and, if desired, particulated or disintegrated. Advantageously, the hydrogen sorbtion is carried out after or concurrently with an etching of the metal powder by suitable etching means, such as an acid. The oxygen electrodes of the present invention may be made from the powder thus obtained, by pressing it into the desired shape and sintering or by hot pressing, or by using it as such by introducing it, if desired, between two porous layers or sieves. A paste may be prepared by the addition of electrolyte.

Acids which were found to be particularly useful as etching agents in the above process comprise such acids as acetic acid, formic acid, oxalic acid or dilute sulfuric acid; the acids may be used singly or as a mixture. The preferred reducing agents are hydrazine and boranates. If it is desired to use readily oxidizable alcohols or aldehydes, such as glycol or formaldehyde, as the reducing agents, it is preferred to add subsequently hydroxyl ions to the solution until a $p_H$ value in the range from about 6.5 to 7.0 is reached.

The above-mentioned catalysts which have the capacity of furthering the activation of oxygen and/or the copper are preferably added to the solution in form of ions and preferably prior to the addition of the reducing agent.

Further advantages may be achieved, if the disintegrated filter cake product of the coated powder is treated at elevated temperatures with a gaseous reducing agent. Excellent results are obtained when there is used for this purpose hydrogen as the gaseous reducing agent at a temperature between 180° C. and 500° C.

In the preparation of the electrodes from the new catalytically active particulate material of the invention, it is in many cases desirable to add or admix to the powder, prior to the pressing and sintering or hot pressing, respectively, materials such as magnesium carbonate, which are capable of forming pores in the finished electrodes and/or fillers.

The novel silver-containing porous electrodes of the present invention are especially well suited for use in electrochemical apparatus as oxygen-dissolving electrodes or an oxygen-liberating electrodes. They may be used with particular advantage in heavy water concentration equipment, electrolytic apparatus and electrodialytic apparatus of all kinds, in primary elements and especially also in fuel cells and fuel cell batteries.

As stated hereinbefore, the new catalytically active particulate material of the present invention is based on such particulate materials which consist of or contain metals which are capable of sorbing hydrogen. Many metals are known which have the capability of sorbing hydrogen and to activate hydrogen at least when they take it or give it up. Practically all known hydrogenating and dehydrogenating catalysts have this property. Among these may be mentioned the noble metals inclusive of such metals as palladium, platinum, ruthenium, rhodium, iridium, osmium, copper, silver, gold, nickel, iron and the like. For use of the catalytically active particulate material in the commercial manufacture of the electrodes of the invention there are selected primarily those metals which are resistant to the electrolyte with which the electrodes are to be used. If the catalyst electrodes are to be used with acid electrolytes like sulfuric acid, the nobels metals are by far preferred for use under the electrochemical conditions encountered in the operation of the electrodes.

For the oxygen electrodes which are to be used with alkaline electrolytes or in an alkaline medium it was found that nickel or iron powder or the alloys of these metals are excellently suited as the starting materials for the preparation of the catalytically active particulate material. They offer not only the advantage of being alkali-resistant, but can also be readily etched, thereby taking up larger quantities of hydrogen. Even though these alkali-resistant metals are already considerably lower priced that the noble metals, it is still possible to further lower the cost of the electrodes and their starting materials by coating solid or preferably porous carrier materials, such as aluminum oxide, magnesium oxide or alkali-resistant silicates, in known manner with the said metals. Where the electrodes are used in acid electrolytes, a suitable carrier can be used for the noble metals, like magnesium or aluminum, which then can be etched, if desired, with suitable means such as an alkali.

In the preparation of the silver-containing cover layers it is important that the proportion of silver in these layers be adequate. Excellent performance of the electrodes is achieved if the silver constitutes a major proportion, that is constitutes more than 50 percent by weight of the cover layer.

In some cases it is preferred to sinter the catalytically active particulate material of the invention onto an electrically conducting carrier foil or plate. Electrodes obtained in this manner are not only suitable to be used in fuel cells or fuel cell batteries but are also very well suited for use in electrolytic apparatus and in heavy water recovery apparatus.

The novel, catalytically active particulate material of the invention may also be used with primary elements, especially with dry cells and dry cell batteries. If the particles obtained in accordance with the process of the invention are added to the depolarizer of the element or cell they have the advantage that higher currents than usually obtainable can be delivered.

The sintered electrode of the invention may be used in a fuel cell as a gas-diffusion electrode; it can be operated after a treatment with a hydrogenation agent in form of a single-layer electrode. However, presently it is preferred to provide those areas of the electrode which contact the liquid electrolyte with a porous layer which has a pore size smaller than the catalytically active layer of the electrode. The fuel cell may be designed in this case such that practically all of the electrolyte is soaked up in said finely porous layer.

It is not required to use the steps of pressing and sintering in the manufacture of the electrodes of the present invention. They may be employed as gas-diffusion electrodes in form of a paste, if the catalytically active particulate material of the invention is inserted between supporting means. The catalytically active powder of the invention can be used in a fuel cell (in which the oxidant is transported by the electrolyte to the electrode) by holding in place by suitable means such as between porous plates or sieves as supporting members. In such cases it is only necessary that either the layer of the supporting structure facing the electrolyte has smaller pores than the paste or that the layer of the supporting structure facing the gas chamber be of substantially larger pores than the paste.

In the manufacture of the electrodes and of the catalytically active particulate material of the invention, it is highly desirable to maximize hydrogen sorbtion by etching the particulate metal powder at its surface prior to or concurrently with the step of sorbtion of hydrogen. Nickel powder, alone or in mixture with iron and/or cobalt, has proven to be an excellent starting material. As most preferred metal there is used nickel in the form of the carbonyl nickel powder. Alternatively, one may also use equally well powdered nickel metal as it is obtained, for instance, by the reduction of suitable nickel compounds or by electrolytic deposition. Especially suited is a metallic powder which has a large free surface area because it absorbs hydrogen faster and because it provides, after the coating with the silver deposited in accordance with the present invention, a large catalytically active surface. This extensive catalytically active surface area is present also in the finished, sintered electrodes of the present invention because the sintering or hot pressing of the particulate material of the invention can be carried out at a lower temperature than is generally employed for this purpose, thereby preserving the catalytic surfaces.

In the preferred embodiment of the process of the present invention, the etching is suitably achieved by treatment with acid solutions. It can also be attained by the mixing of the metal powder with acid salts with subsequent heating. However, in the latter method the etching may not be as uniform as if it is carried out in liquids. Suitable etching agents are primarily the nonoxidizing acids. Especially suited are acetic acid, formic acid, oxalic acid and dilute sulfuric acid. Oxidizing acids may also be used if they are employed suitably diluted. The desired degree of etching is achieved by controlling the concentration of the acids, the duration of the treatment and the temperature of the treatment. For one skilled in the art, these optimum conditions for a given acid and metal starting material are readily determinable.

In the etching step the metal particles usually increase in volume to varying degrees and change their color at the same time. After completion of the etching of the suspended metal particles, the solution is cooled, preferably to room temperature, if the etching was performed at elevated temperatures. Thereafter, the silver-ion-containing solution is added, which again results in a change of color of the metal particles, with a simultaneous decrease of the volume of the metal particles. Apparently the hydrogen given off by the individual metal particles deposits part of the silver-ions in form of silver nuclei on the activated surface of the metal particles. Thereafter, a sufficient amount of a reducing agent is added and a $p_H$ value close to neutral is established. All of the silver contained in the solution is thereby precipitated with the inclusion of any of the other metal-ions contained in the solution onto the surface of the particles of the metal powder.

If the metal powder which has not been etched is suspended in a solution of silver-ions with subsequent addition of a reducing agent, the silver is deposited on the surface of the metallic powder only partially.

Hydrazine and the soluble boranates are especially suited for use as reducing agents. However, the precipitation of the silver onto the etched metal powder can also be carried out with less costly reducing agents, such as a glycol and formaldehyde. With these reducing agents, it is desirable to add alkali until a $p_H$ value of about 7 or slightly below, such as between 6 to 7, has been reached in order to complete the precipitation.

Electrodes of still higher effectiveness can be obtained if copper ions are added in addition to the silver ions to the solution prior to the precipitation of the silver. If desired, or required for the contemplated use of the electrodes, ions of such metallic catalysts which are known to facilitate and further the oxygen activation may be added to the solution in addition to the silver-ions. These ions are likewise added to the solution prior to the precipitation of the silver so that they are precipitated and deposited onto the metallic base particles in intimate mixture with the silver.

The precipitate of silver-coated metal particles is then isolated, washed and dried. A separate step of crushing or grinding of the cake of the coated metal powder is generally not required. Where silver-coated nickel powder is made, the powder remains evenly fine, and for the further processing and use in the electrodes no grinding, sifting or classification of the powder is required.

Occasionally it appears advantageous to treat the dried powder with a gaseous reducing agent, especially with hydrogen gas at elevated temperatures, particularly in the range from 180° C. to 500° C. Powders treated in this manner result in electrodes which have a higher potential if they are operated at a load of lower current density.

If it is desired to use the metallic powder of the present invention as the starting material in the production of gas-diffusion electrodes, it is of particular advantage to admix to the metallic powder such materials which are known to produce pores. This permits the control of the pore size and the production, if desired, of additional ranges of pore sizes otherwise not available.

The following examples are not to be construed as limiting the invention, but are merely illustrations thereof.

EXAMPLE 1

There are diluted 140 cc. of glacial acetic acid with 2 liters of water and 200 g, gray-black carbonyl nickel powder is added. The suspension is then boiled for 2 minutes. About 10 to 15 minutes after the mixture has first reached the boiling point the powder expands in volume with initially slight hydrogen liberation and with the simultaneous taken up of the hydrogen by the nickel, which thereby takes on a deep black color. During this treatment the nickel powder establishes the hydrogen potential.

There are separately dissolved 60 g. of silver in the stoichiometrical quantity of nitric acid to form a solution which is mixed after cooling with the cooled acid dispersion of the etched metal particles, and 100 cc. of a 40 percent by weight of formaldehyde solution are slowly poured into the combined solutions with rapid stirring. This produces a change of the color of the powder toward a grayish-green color. Thereafter IN KOH is added drop-wise until the solution has a $p_H$ value of about 6.8 to 6.9. Thereafter the supernatant solution is decanted, the precipitate is slurried in water, filtered, washed and then dried. A cake is obtained which readily crumbles to a powder on touch. The product is now ready for use e.g. in electrolytic processes

EXAMPLE 2

For the production of the working layer of an electrode there are provided 17 g. of a mixture consisting of one part by weight of ammonium carbonate and five parts by weight of the catalytically active metal powder obtained in example 1. For the production of the cover layer of the electrode there is provided 3 g. of the same metal powder without the addition of ammonium carbonate. The working layer and the cover layer are formed from these materials in the usual manner by compressing at a pressure of 1 ton per cm² and brought into a sintering oven where the material is heated to 100° C. to 130° C. and held at that temperature for about 30 minutes. The ammonia and carbon dioxide resulting from the decomposition of the ammonium carbonate slowly escape without the formation of cracks and breaks in the cover layer. Subsequently, the temperature is raised for 15 minutes to 180° C. and thereafter the electrode is sintered for 30 minutes at 550° C.

The electrochemical properties of an electrode produced in this manner are represented in curve 2 of FIG. 1 of the attached drawings.

EXAMPLE 3

A catalytically active particulate material in accordance with the invention also containing copper is made by dissolving 60 g. of silver in nitric acid and adding to the solution thus obtained a solution of 10 g. Cu $(NO_3)_2 \cdot 6 H_2O$ in 50 cc. of water. Thereafter, there is added ammonia to this solution until the solution is clear. A slurried mixture of carbonyl nickel and carbonyl iron is etched in the manner described in example 1 and the above described clear solution is added to the slurry.

There is then added a 40 percent by weight solution of formaldehyde at once with rigorous stirring. When the solution is adjusted to the desired $p_H$ around neutral by the addition of an 1N KOH solution it becomes apparent that the ammonia which had originally been added is liberated. This is provided by vigorous stirring.

The catalytically active particulate precipitate material obtained in this manner is isolated and covered in the manner described in example 1. The surface coating of the individual particles contains in addition to silver also a small proportion of copper.

EXAMPLE 4

FIG. 1 shows three curves characterizing electrodes of the invention of various compositions.

Curve 1 was obtained with a single-layer electrode which is made from carbonyl nickel particles coated with silver in accordance with the present invention and containing 25 percent by weight of silver. The electrolyte was 6 N NaOH. The electrode was operated with air at a pressure of 1 atmosphere above atmospheric pressure at 17° C. There was some gassing of the electrode on the side facing the electrolyte.

Curve 2 shows the results obtained with a two-layered electrode. The catalytically active layer consisted of carbonyl nickel particles coated with silver in accordance with the present invention and containing 22.86 percent by weight silver. The very finely porous cover layer consisted of carbonyl nickel particles. The electrode was operated in 6 N KOH at 18° C. with pure oxygen (technical grade) under a pressure of 1 atmosphere above atmospheric pressure.

Curve 3 is based on the data obtained with a similarly constructed two-layered oxygen electrode. The finely porous inactive cover layer was likewise made from carbonyl nickel. The catalytically active layer was made from silver-coated carbonyl nickel of large surface area. The coating contained besides silver also palladium. The coated nickel particles analyzed for 19.72 percent by weight silver, 0.68 percent by weight palladium and the remainder nickel. The electrode was operated in 6 N KOH electrolyte, at a temperature between 19° C. and 20° C. The operating gas was technically pure oxygen at a pressure of 1 atmosphere above atmospheric pressure. As can be readily seen, the electrode in this example provided at smaller current densities a significantly improved potential over the electrode characterized by curve 2.

EXAMPLE 5

FIG. 2 demonstrates the effect of the operating temperature upon the electrochemical properties of an electrode made in accordance with the present invention and proves the excellent levels of electrochemical performance which can be obtained with this type of electrodes. The nickel powder used for the construction of the electrode used in this example was etched as described hereinbefore and provided with a coating which contained copper in addition to silver. The ions of these two catalyst metals were added in a common solution in form of the amine complexes to the suspension of the nickel powder in dilute sulfuric acid as it was obtained in the etching step of the nickel powder. The catalytically active layer of the electrode analyzed at 74.9 percent by weight nickel, 22.96 percent by weight silver and 1.58 percent by weight copper. The inactive, finely porous cover layer of the electrode was made of carbonyl nickel particles.

The electrode was operated at varying temperatures in an electrolyte of 5 N KOH, with technically pure oxygen at a pressure of 1 atmosphere above atmospheric pressure. Curve 4A was obtained at an operating temperature of 17° C., curve 4B at 40° C. and curve 4C at 60° C.

The results of this experiment show that even though the electrode was operated at 60° C. with a load of 800mA/cm$^2$ the polarization did not exceed a value of about 400 mV.

The catalytic material and the oxygen electrodes of the present invention are distinguished by a combination of unique advantageous properties. Among these are the following.

The special, novel structure of the particulate material has the unexpected effect of delaying the "aging process" of the activated silver, which is known to occur especially readily with silver catalysts of the prior art as a result of the destruction of catalytically active sites.

The electrodes possess an increased and remarkable electrochemical efficiency.

By the presence and inclusion of the the components in the silver coating of the particles during the etching step, the electrodes remain longer in a highly activated state and thus have a longer useful life.

The use of the so-called "Carbonyl Lightweight Powders" and/or the use of metal-covered or impregnated fillers permits the production of lightweight electrodes having the above recited advantages.

The electrodes of the invention possess a remarkably high mechanical strength apparently because of the ductility of the surface coating of the metal particles.

The surface coating is surprisingly firmly bonded to the particle cores. Apparently this may be due to the fact that the surface layer is anchored on the central core particle in that it grows out of crevices in the fine structure of the particles.

Many widely different embodiments of this invention may be made without departing from the gist thereof. Accordingly, the invention is not limited to the specific embodiments shown and explained herein except as defined the appended claims.

EXAMPLE 6:

200 g. of carbonyl nickel T 255 (so-called "light" carbonyl nickel) are introduced into an acetic acid solution (120 cc. glacial acetic acid in 2 liters of aqua dest.) and heated to the boil. After the carbonyl nickel has been loaded with hydrogen gas, after cooling, a solution containing 85 g. of silver nitrate in 1 liter of water is added under vigorous agitation. After washing of the catalyst with dest. water and drying at 105° C. the resulting catalyst material is reduced for one hour at 400° C. in hydrogen atmosphere.

From his product three layer electrodes are manufactured by a hot-pressing process in the following way;

| | |
|---|---|
| Fine pored layer: ("cover"-layer) | 5 g. carbonyl nickel T 255 |
| Medium-pored catalyst layer: ("working" layer) | 28 g. of an intimate mixture of the catalyst material with filler (83% catalyst + 17% sodium carbonate, 40–71μ particle size. |
| Coarse-pored layer: | 40 g. of a mixture consisting of 66% carbonyl nickel T 255 and 34% sodium carbonate (particle size 100–200μ). |

The layers are filled into a matrix (dia. 80 mm.) in the above sequence. The matrix is then heated up to 430° C. and at this temperature pressed with 0.25 tons per cm.$^2$.

After dissolution of the filler by boiling in water the electrode is ready for use.

I claim:

1. A process for the preparation of a coated catalytically active particulate material which comprises sorbing hydrogen in a suspension of particulate hydrogen-sorbing metal, treating the metal particles with a silver-ion-containing solution, reducing the silver to the metallic state thereby depositing the silver onto said particles, and recovering the silver-coated particles.

2. The process of claim 1, in which the hydrogen sorbtion is carried out in an etching solution for the metal particles.

3. The process of claim 1, in which there are present in the solution prior to the addition of the reducing agent ions of one of the following: an oxygen-activating catalyst and copper.